(12) United States Patent
Yamashita

(10) Patent No.: US 7,076,162 B2
(45) Date of Patent: Jul. 11, 2006

(54) MOBILE EQUIPMENT AND MOBILE PHONE WITH SHOOTING FUNCTION

(75) Inventor: Kouji Yamashita, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/186,804

(22) Filed: Jul. 22, 2005

(65) Prior Publication Data

US 2005/0254810 A1    Nov. 17, 2005

Related U.S. Application Data

(63) Continuation of application No. 10/507,630, filed as application No. PCT/JP03/03101 on Mar. 14, 2003.

(30) Foreign Application Priority Data

Mar. 15, 2002  (JP)  ............... 2002-071967
May 15, 2002   (JP)  ............... 2002-139727

(51) Int. Cl.
*G03B 15/03*  (2006.01)
*H04N 5/222* (2006.01)

(52) U.S. Cl. .................. 396/157; 396/164; 396/182; 396/201; 348/371

(58) Field of Classification Search ............... 396/157, 396/164, 155, 129, 182, 201–204; 348/370, 348/371; 455/556.1
See application file for complete search history.

(56) References Cited

U.S. PATENT DOCUMENTS

| 6,299,322 | B1 * | 10/2001 | Yokota ............... 362/85 |
| 6,823,198 | B1   | 11/2004 | Kobayashi |
| 2001/0053703 | A1 | 12/2001 | Kobayashi |
| 2003/0107656 | A1 * | 6/2003 | Ito et al. ............... 348/216.1 |
| 2005/0157174 | A1 * | 7/2005 | Kitamura et al. ...... 348/207.99 |

FOREIGN PATENT DOCUMENTS

| DE | 100 07 866 A1 | 8/2001 |
| DE | 201 15 803 U1 | 3/2002 |
| EP | 1061407 A1 | 12/2000 |
| JP | 2-73239 A | 3/1990 |
| JP | 5-328210 A | 12/1993 |
| JP | 9-68742 A | 3/1997 |
| JP | 10-48708 A | 2/1998 |
| JP | 11-133490 A | 5/1999 |
| JP | 2000-66292 A | 3/2000 |
| JP | 2000-89318 A | 3/2000 |
| JP | 2000-235245 A | 8/2000 |
| JP | 2001-66658 A | 3/2001 |
| JP | 2001-111656 A | 4/2001 |
| JP | 2001103131 A | 4/2001 |

(Continued)

*Primary Examiner*—W. B. Perkey
(74) *Attorney, Agent, or Firm*—Birch, Stewart, Kolasch & Birch, LLP

(57) ABSTRACT

Mobile equipment includes LEDs supplied with a current to emit red light, green light and blue light, FETs and a booster circuit for controlling the current supplied. The current supplied is controlled to supply all of the LED with a current of a low level to illuminate an object in a shooting mode with light for illumination. Thus in the shooting mode a white spot light illuminates the object, and the object can clearly be confirmed. At the moment of shooting, a current supplied can be increased at a burst to emit white flashlight to illuminate the object. A satisfactory image can thus be obtained. The source of light for illumination can be formed of miniature, light-weight LED, and does not impair in mobility mobile equipment having the source of light incorporated therein.

18 Claims, 8 Drawing Sheets

FOREIGN PATENT DOCUMENTS

| | | |
|---|---|---|
| JP | 2001-217904 A | 8/2001 |
| JP | 2001-275051 A | 10/2001 |
| JP | 2001-320447 A | 11/2001 |
| JP | 2001-320461 A | 11/2001 |
| JP | 2001-345899 A | 12/2001 |
| JP | 2003-66519 A | 3/2003 |
| JP | 2003-140236 A | 5/2003 |
| JP | 2003-158676 A | 5/2003 |
| JP | 2003-163759 A | 6/2003 |
| JP | 2003-174587 A | 6/2003 |
| JP | 2003-179808 A | 6/2003 |
| JP | 2003-433625 | 5/2004 |
| JP | 2003-434305 | 5/2004 |
| WO | WO-95/15062 A1 | 6/1995 |

\* cited by examiner

MOBILE EQUIPMENT AND MOBILE PHONE WITH SHOOTING FUNCTION

This application is a Continuation of co-pending application Ser. No. 10/507,630 filed on Sep. 14, 2004 and for which priority is claimed under 35 U.S.C. § 120. Application Ser. No. 10/507,630 is the national phase of PCT International Application No. PCT/JP03/03101 filed on Mar. 14, 2003 under 35 U.S.C. § 371. The entire contents of each of the above-identified applications are hereby incorporated by reference.

TECHNICAL FIELD

The present invention relates to mobile equipment and mobile phones with a shooting function and in particular to those having an illumination function for shooting.

BACKGROUND ART

Conventionally in shooting pictures in dark places a xenon tube is typically used as a source of light for electronic flash for illumination. The xenon tube can emit a sufficient quantity of light. However, peripheral circuitry driving the xenon tube requires a highly voltage withstanding, large-capacity capacitor, a voltage transformer and the like. Consequently, the source of light for electronic flash employing the xenon tube has a physically increased geometry. As such, it has been significantly difficult to mount an auxiliary source of light of this type in miniature mobile equipment having a shooting function. Conventionally for example camera equipped mobile phones are equipped with an auxiliary source of light using a xenon tube to shoot pictures with the camera. The auxiliary source of light is physically large in geometry, as has been mentioned, and has accordingly been detachably attached to a mobile phone, rather than incorporated therein.

As conventional art employing LED, Japanese Patent Laying-Open No. 5-328210 discloses an illumination device using a light emitting diode (LED) for a TV camera that is synchronized with the TV camera's shuttering operation to emit light in pulse. Furthermore, Japanese Patent Laying-Open No. 9-68742 discloses a shooting apparatus employing an LED for light for illumination for shooting for synchronization between the LED's illumination period and the camera's shooting period. An illumination device employing an LED of Japanese Patent Laying-Open No. 10-48708 synchronizes a charge coupled device (CCD) electronic shutter camera's exposure and of the LED's emission of light in pulse.

The techniques disclosed in these publications do indicate that illumination for shooting is provided by using an LED. However, they only disclose a technique employed to synchronize a timing of driving the LED and that of picking up an image. Furthermore, Japanese Patent Laying-Open No. 2000-66292 discloses that when an apparatus transfers onto a color film the data shot by a camera, it selects one of LEDs emitting different colors of light depending on different background colors and causes the selected LED to emit light to allow a clear record regardless of the color of the background.

While the above mentioned publications do indicate that light for illumination is provided by using an LED, none of the documents indicates that mobile equipment employs an LED to generate and direct white light for illumination to an object.

When a mobile phone is typically used to shoot a picture of an object via a camera, the mobile phone is often positioned to face the object for example to take a picture of the object's face at a short distance in closeup. The shot image can be digitally processed to be adjusted, and the camera equipped mobile phone does not require an auxiliary source of light providing as much a quantity of light as provided by a xenon tube. Accordingly, there is a demand for an auxiliary source of white light smaller in size and consuming less power than the xenon tube.

DISCLOSURE OF THE INVENTION

The present invention contemplates mobile equipment having a shooting function and incorporating a miniature and less power consuming source of light for illumination used to confirm objects.

The present invention in one aspect provides mobile equipment having a shooting function including: a camera unit; a light source unit having a light emitting diode arranged on a surface provided with the camera unit; an input device having a shutter key and an illumination key; and a controller operative in response to the shutter key being operated to store to a previously prepared memory image data received from the camera unit, and operative in response to the illumination key being operated to start the light source unit to provide illumination whether or not the shutter key is operated.

If an object is in a dark environment and cannot be recognized, the illumination key can be operated (pressed) to continuously output light for illumination of a level allowing the object to be recognized. With the light for illumination the user can locate the object and shoot the object's image.

Preferably, with the light source unit providing illumination when the shutter key is operated the controller stores to the memory image data output from the camera unit and thereafter terminates illumination provided by the light source unit.

This can help the object to recognize that an image of the object has been shot. Furthermore, it can also prevent the user from forgetting to turn off the light emitting diode.

Preferably, with the light source unit providing illumination when the shutter key is operated the controller responsively increases a quantity of light of the light source unit. In shooting the object's image the object's eyes can receive less dazzling light than when a flashlight of high illuminance is suddenly output in a dark place.

Preferably, when the controller having increased a quantity of light of the light source unit in response to the shutter key being operated decreases the quantity of light of the light source unit after image data output from the camera unit is stored to the memory. The light emitting diode can be operated at high intensity for a reduced period of time. Its burden can be alleviated.

The present invention in another aspect provides mobile equipment including: a camera unit; a light source unit having a light emitting diode arranged on a surface provided with the camera unit; an input device having a shutter key and an illumination key; and a controller operative in response to the illumination key being operated to start the light source unit to provide illumination, and operative in response to the shutter key being operated to store to a previously prepared memory image data output from the camera unit, and with the light source unit providing illumination when the shutter key is operated the controller stores to the memory image data output from the camera unit and thereafter terminates illumination provided by the light source unit.

The present invention is still another aspect provides mobile equipment including: a camera unit; a light source unit having a light emitting diode arranged on a surface provided with the camera unit; an input device having a shutter key and an illumination key; and a controller operative in response to the illumination key being operated to start the light source unit to provide illumination, and operative in response to the shutter key being operated to store to a previously prepared memory image data output from the camera unit, wherein with the light source unit providing illumination when the shutter key is operated the controller responsively increases a quantity of light of the light source unit.

Preferably, the controller having increased a quantity of light of the light source unit in response to the shutter key being operated decreases the quantity of light of the light source unit after image data output from the camera unit is stored to the memory. The light emitting diode can be operated at high intensity for a reduced period of time. Its burden can be alleviated.

The present invention is still another aspect to provides a mobile phone having a shooting mode and a plurality of types of modes of operation, including: a camera unit; a light source unit having a light emitting diode arranged on a surface provided with the camera unit; an input device having a shutter key and an illumination key; and a controller responsive in the shooting mode to the illumination key being operated to start the light source unit to provide illumination, and also responsive in the shooting mode to the shutter key being operated to store to a previously prepared memory image data output from the camera unit, the controller changing in accordance with the types of modes of operation a color of light emitted by the light source unit.

If an object is in a dark environment and cannot be recognized, the illumination key can be pressed to continuously output light for illumination of a level allowing the object to be recognized. With the light for illumination the user can locate the object and shoot the object's image. Furthermore, the light emitting diode can be used for both illumination and indication of a mode of operation, and thus contribute to a further reduced size of the apparatus.

Preferably, the light source unit is formed of three light emitting diodes emitting red light, green light and blue light, respectively; and in the shooting mode when the illumination key is operated the controller allows the three light emitting diodes to all emit light to start illumination.

Thus in the shooting mode light emitting diodes emitting red light, green light and blue light can all emit light. A source of light emitting white light can thus be obtained and the white light can be emitted to illuminate an object.

Preferably, the controller changes a color of light emitted by the light source unit to emit a color of light for detection of reception of a call, and a different color of light for detection of reception of mail. Furthermore when reception (of a call or mail) is detected, the controller may turn on the light source unit to emit a predetermined color of light.

When an incoming call is detected the light source unit emits light of a color and when incoming mail is detected the light source unit emits light of a different color. The user can visually recognize whether a call or mail has arrived, and the user can make a subsequent response quickly.

Preferably, the controller turns on the light source unit to a sound signaling reception. This can make it more fun for the user to receive a call, mail or the like.

Preferably, when the mobile phone is operated to run software for a game the controller turns on the light source unit in synchronization with a sound effect of the game. This can make it more fun for the user to play the game.

The present invention in one aspect provides mobile equipment having a function to shoot an image of an object, including a camera unit and a light source unit serving as an auxiliary source of light for shooting to emit white light, wherein the light source unit is implemented by a light emitting diode to emit white light.

More specifically, it further includes a light source unit having light emitting devices supplied with a current to generate red light, green light and blue light, respectively, and a current supply controller controlling a current supplied to the light emitting devices, and the current supply controller supplies all of the light emitting devices with a current to illuminate an object in a shooting mode with light for illumination.

Thus in the shooting mode the light emitting devices generating red light, green light and blue light and are all supplied with a current to emit light. A source of light emitting white light can thus be obtained and the white light can thus be emitted to illuminate the object.

Thus in the shooting mode the object is exposed to white light for illumination. In natural light, the object can receive a spot light and thus more clearly be confirmed.

In the above described mobile equipment the light source unit is preferably formed of a plurality of types of light emitting diodes. The diodes can be combined together to emit light to generate white light.

The above described mobile equipment preferably has a plurality of types of modes of operation and a light emitting diode selected in accordance with a type of mode of operation of the mobile equipment can be supplied with a current. A selected one or more thereof combined together can emit light to visually signal the current mode of operation.

In the above described mobile equipment the light source unit is preferably formed of a white light emitting diode.

The above described mobile equipment preferably includes a current supply controller controlling a current supplied to the light source unit's light emitting diode so that at the moment of shooting, the current is increased to a level to allow light for illumination to become a flashlight.

Thus at the moment of shooting, or at the right moment to release the shutter, the object can be exposed to a white flashlight. If the object is in a dark place a satisfactory image of the object can be obtained.

The above described mobile equipment outputs from a single light source unit selectively a flashlight emitted in shooting an image of an object and light different from the flashlight in illuminance and time of illumination. It allows light to be emitted with an illuminance for a period of time, as selected to accommodate a purpose, an application and the like.

The present invention in another aspect provides mobile equipment corresponding to equipment having a function to shoot an image of an object, including a plurality of keys operated to input information, incorporating a light emitting diode operated to emit white light via the key. The white light emitted via the key can provide white light for illumination in shooting an image of an object.

In the above described mobile equipment a current is supplied in the light emitting diode's forward direction. While a light emitting device is xenon tube, a lamp or the like, the light emitting diode allows the light emitting device to be reduced in size and weight, and if a light source unit is mounted the mobile equipment can still be compact.

In the above described mobile equipment preferably a plurality of types of light emitting diodes are connected in series.

In the above described mobile equipment preferably a plurality of types of light emitting diodes are connected in parallel.

BEST MODE FOR CARRYING OUT THE INVENTION

Hereinafter the present invention in embodiment will be described with reference to the drawings. In the present embodiment, light for illumination for example for shooting is emitted by a light emitting device implemented by an LED. In recent years an LED emitting blue light has been developed, and LEDs now can be used to provide emission of white light. An LED can be driven by a simple circuit and significantly readily handable.

The present embodiment assumes as mobile equipment having a shooting function a mobile phone integrally equipped with a subminiature digital camera. This mobile phone has mounted therein three LEDs emitting red (R) light, green (G) light and blue (B) light, respectively. These three LEDs are simultaneously operated to emit light to provide and use emission of white light as an auxiliary source of light for illumination in shooting with the digital camera. The mobile equipment can be compact and also integrally equipped with a source of light for illumination provided by emission of white light for shooting.

When a plurality of LEDs are used to shoot an image, the LEDs are operated to simultaneously emit light or sequentially emit light within an exposure period of time. If the LEDs are operated to sequentially emit light, a reduced current consumption can be achieved and each LED's durability can be improved. However, a reduced total quantity of light is invited, and to provide an increased quantity of light a large number of LEDs are required. In contrast, operating LEDs simultaneously to emit light allows a smaller number of LEDs to be used to provide a large a quantity of white light and the light source unit to be reduced in size. Accordingly in the present embodiment a method of operating LEDs to simultaneously emit light will be described.

Figure 1:
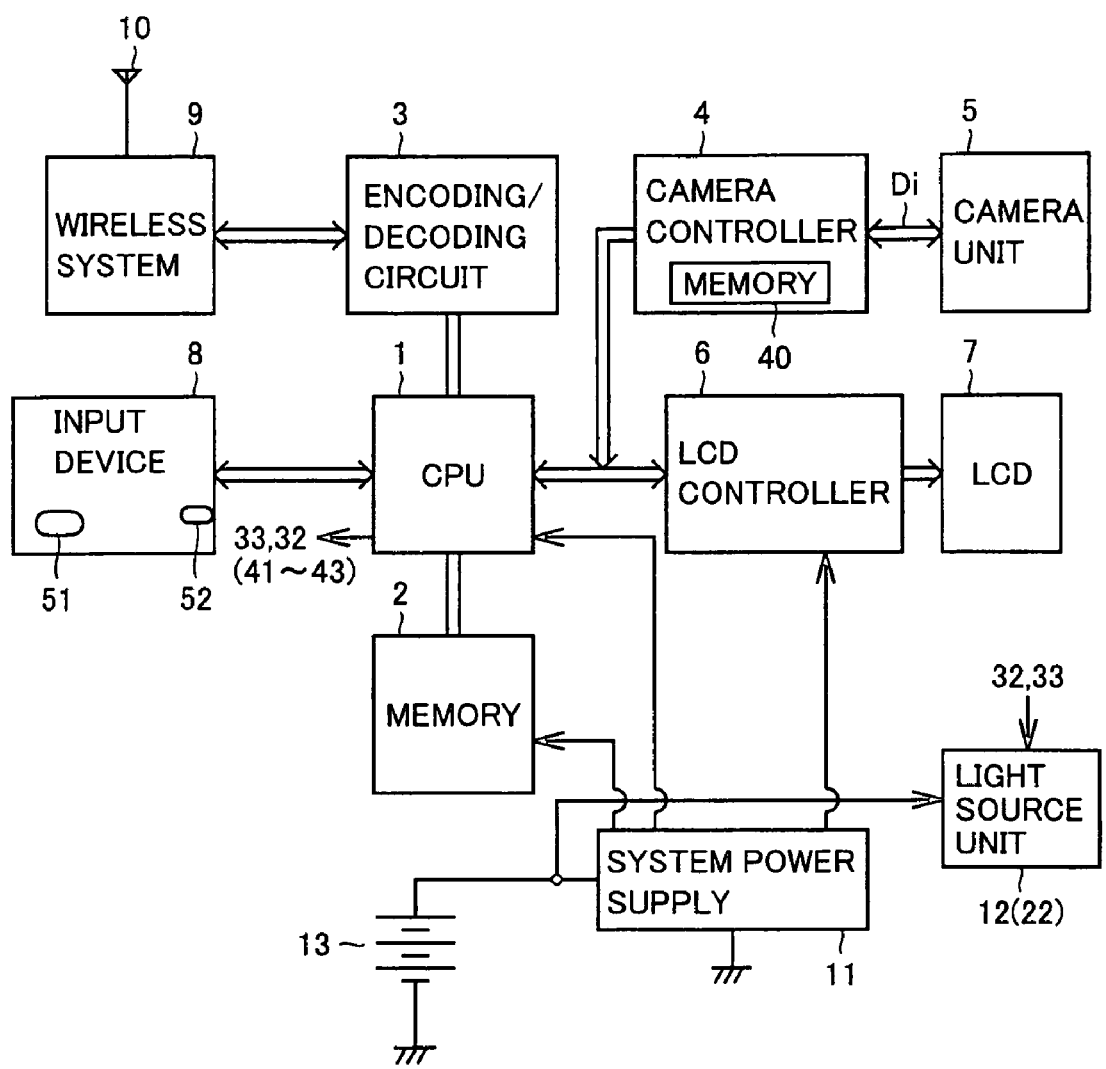
FIG. 1 shows a configuration of a mobile phone equipped with a shooting function in accordance with an embodiment.
Figure 2:
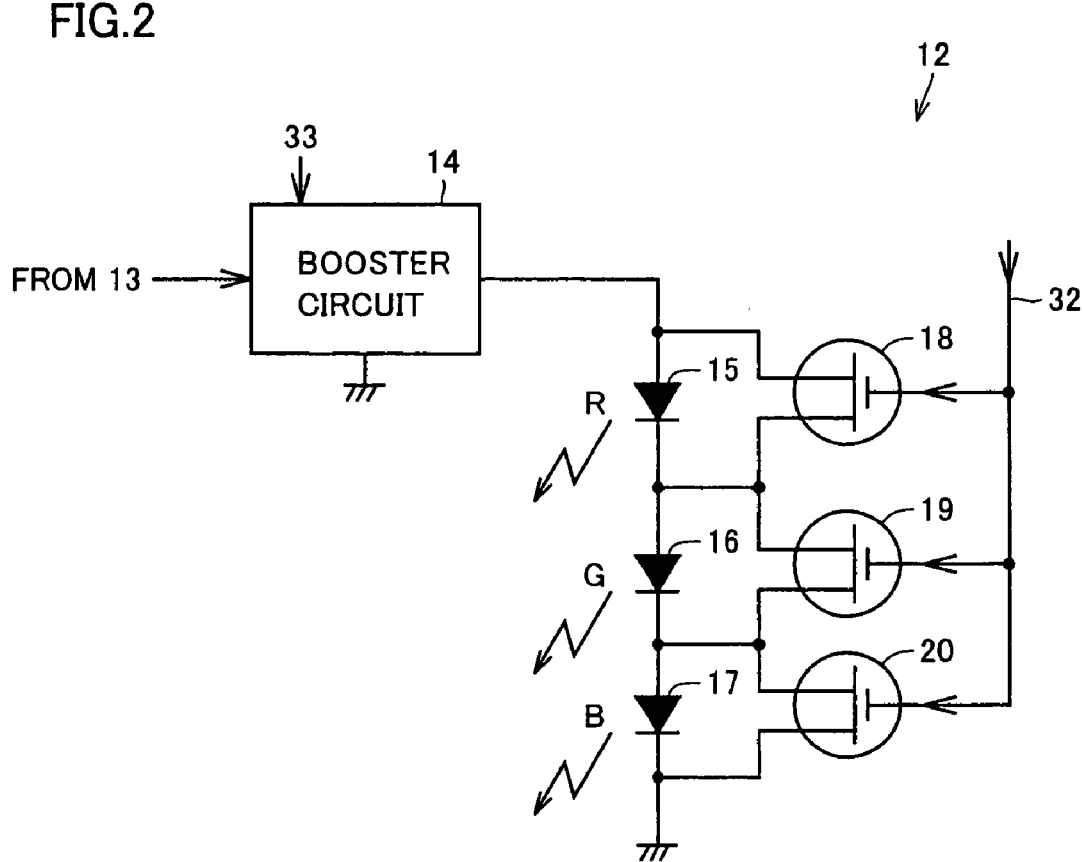
FIG. 2 shows an exemplary configuration of a light source unit in an embodiment.
Figure 3:
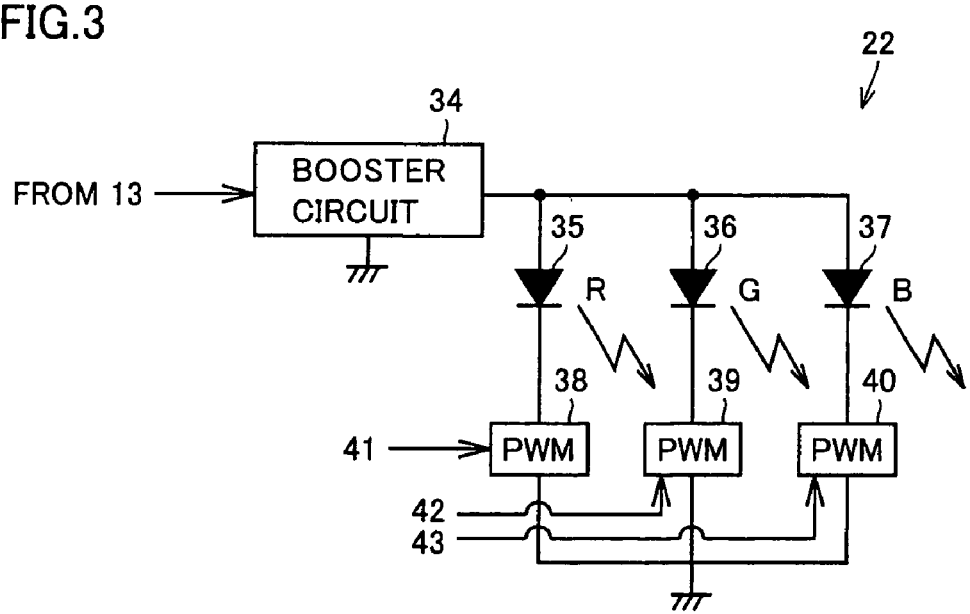
FIG. 3 shows another exemplary configuration of the light source unit in the embodiment.

FIG. 1 shows a configuration of a mobile phone equipped with a shooting function in accordance with the embodiment. FIG. 2 shows an exemplary configuration of a light source unit in accordance with the present embodiment and FIG. 3 shows another exemplary configuration thereof.

Figure 4A:
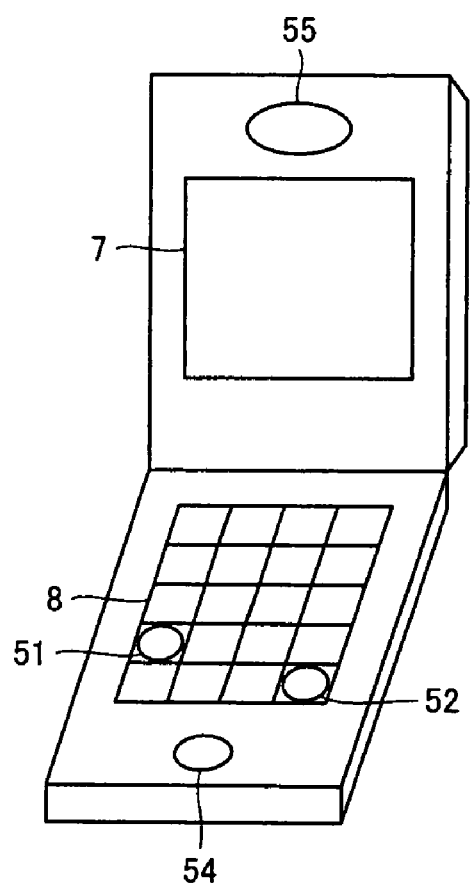
FIGS. 4A and 4B show an external appearance in front and rear views, respectively, of a mobile phone in an embodiment.
Figure 4B:
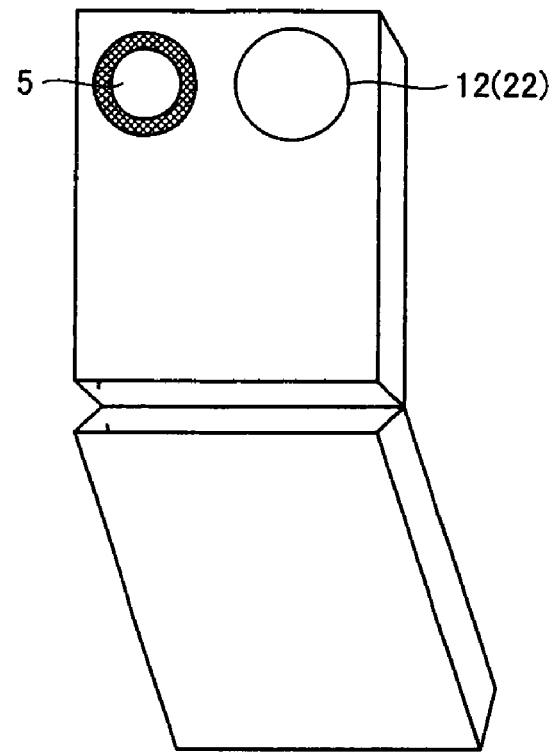

FIGS. 4A and 4B show an external appearance in front and rear views, respectively, of the mobile phone in accordance with the present embodiment. With reference to FIG. 4A, the mobile phone in the front view includes a liquid crystal display (LCD) 7 displaying an image and a variety of information, an input device 8 having numeral keys and other similar, plurality of keys externally operable to input information, and a microphone 54 and a receiver 55 receiving and outputting a speech for communications. Input device 8 includes an illumination key 51 and a shutter key 52. With reference to FIG. 4B, the mobile phone is, as seen in the rear view, provided in a single surface with a camera unit 5 shooting an image of an object and a light source unit 12 (22) outputting white light for auxiliary illumination for shooting. When illumination key 51 is pressed, light source unit 12 (22) emits light for illumination of a level allowing an object to be confirmed, and when shutter key 52 is pressed, light source unit 12 (22) emits light for illumination of a level corresponding to a flash for shooting an image of the object.

When the mobile phone's camera unit 5 is used to shoot a picture of an object, the obtained image is displayed on LCD 7. The user observes the displayed image and presses shutter key 52. In response, light source unit 12 (22) emits a flash for shooting the picture of the object. In the flash, the image is shot and its data is output and stored to a memory 40, described later, internal to the mobile phone and thereafter held in a memory 2.

With reference to FIG. 1, the mobile phone includes: a central processing unit (CPU) 1 intensively controlling components; memory 2 having a variety of shot data and programs stored therein; an encoding/decoding circuit 3; a camera controller 4 incorporating memory 40 temporarily storing received image data Di, wherein i=1, 2, 3, . . . n; camera unit 5 controlled by camera controller 4, formed for example of a CCD or a complementary metal oxide semiconductor (CMOS) shooting an image of an object and outputting resultantly obtained image data Di of the object; an LCD controller 6; LCD 7 controlled by LCD controller 6; input device 8; a wireless system 9 and an antenna 10 for wireless communications; a system power supply 11 supplying components with power; light source unit 12 (22); and a battery 13.

Encoding/decoding circuit 3 has a function encoding information transmitted and received via antenna 10 and wireless system 9 to be transmittable, and a function decoding received information to be internally processable. Camera controller 4 receives image data Di picked up by and sequentially output from camera unit 5 and stores the data temporarily in memory 40. Of the temporarily stored image data Di, only image data Di input immediately after shutter key 52 is pressed is stored via memory 40 and finally in memory 2 and the other image data Di are rewritten whenever necessary. Camera controller 4 performs a process for example to adjust white balance, adjust exposure, address red-eye and set an angle of view, as based on image data Di sequentially stored to memory 40 in a mode of shooting by camera unit 5. CPU 1 performs a process for the entirety of the system. System power supply 11 receives voltage from battery 13, adjusts the received voltage to have a prescribed level corresponding to each component and then supplies the adjusted voltage to the component. Light source unit 12 (22)

operates to emit light in response to a control signals 32 (41–43) and 33 received from CPU 1, as described hereinafter. Battery 13 is typically a lithium battery, a nicad battery or the like.

With reference to FIG. 2, light source unit 12 includes a booster circuit 14, an LED 15 outputting red light, an LED 16 outputting green light, an LED 17 outputting blue light, and switching FETs 18–20 corresponding to LEDs 15–17, respectively. Booster circuit 14 operates in response to control signal 33 received from CPU 1 to boost a voltage received from battery 13 to a level required to drive LEDs 15–17, and output the boosted voltage. Booster circuit 14 has a function controlling a constant current circuit and its current so that an output has a constant current level based on control signal 33. Booster circuit 14 has an output having LEDs 15–17 connected thereto in series, and LEDs 15–17 have switching FETs 18–20, respectively, connected thereto in parallel. FETs 18–20 have their respective gates receiving control signal 32 from CPU 1. Control signal 32 controls the FETs 18–20 respective gates to be individually turned on/off. When an FET has its gate turned on, the corresponding LED has opposite ends short-circuited and is thus prevented from receiving a current from booster circuit 14, and only an LED with its associated FET having its gate turned off receives a current from booster circuit 14 in a forward direction to emit light. As such, when control signal 32 turns off all of FETs 18–20, LEDs 15–17 simultaneously receive a current in the forward direction and thus emit light to emit white light for illumination.

Furthermore, FETs 18–20 each receive pulsed voltage which is changed in pulse width. Thereby, the quantities of light emitted by LEDs 15–17 can be adjusted.

FIG. 2 shows three LEDs 15–17 connected in series. Alternatively, as shown in the FIG. 3 light source unit 22, LEDs 35–37 emitting red light, green light and blue light may be connected in parallel. For the FIG. 3 parallel connection, a booster circuit 34 receives a voltage from battery 13 and boosts it to a prescribed level and as a result LEDs 35–37 connected in parallel each receive at one end a current of a constant level in a forward direction. LEDs 35–37 have their respective other ends with pulse width modulation circuits 38–40, respectively, connected thereto. PWM circuits 38–40 receive pulse signals 41–43, which are applied from CPU 1 to the LEDs' respective other ends, to variably adjust the pulses, respectively, in width. LEDs 35–37 can emit red light, green light and blue light in quantities each fine-adjusted by a width of a pulse applied.

Figures 5A, 5B:
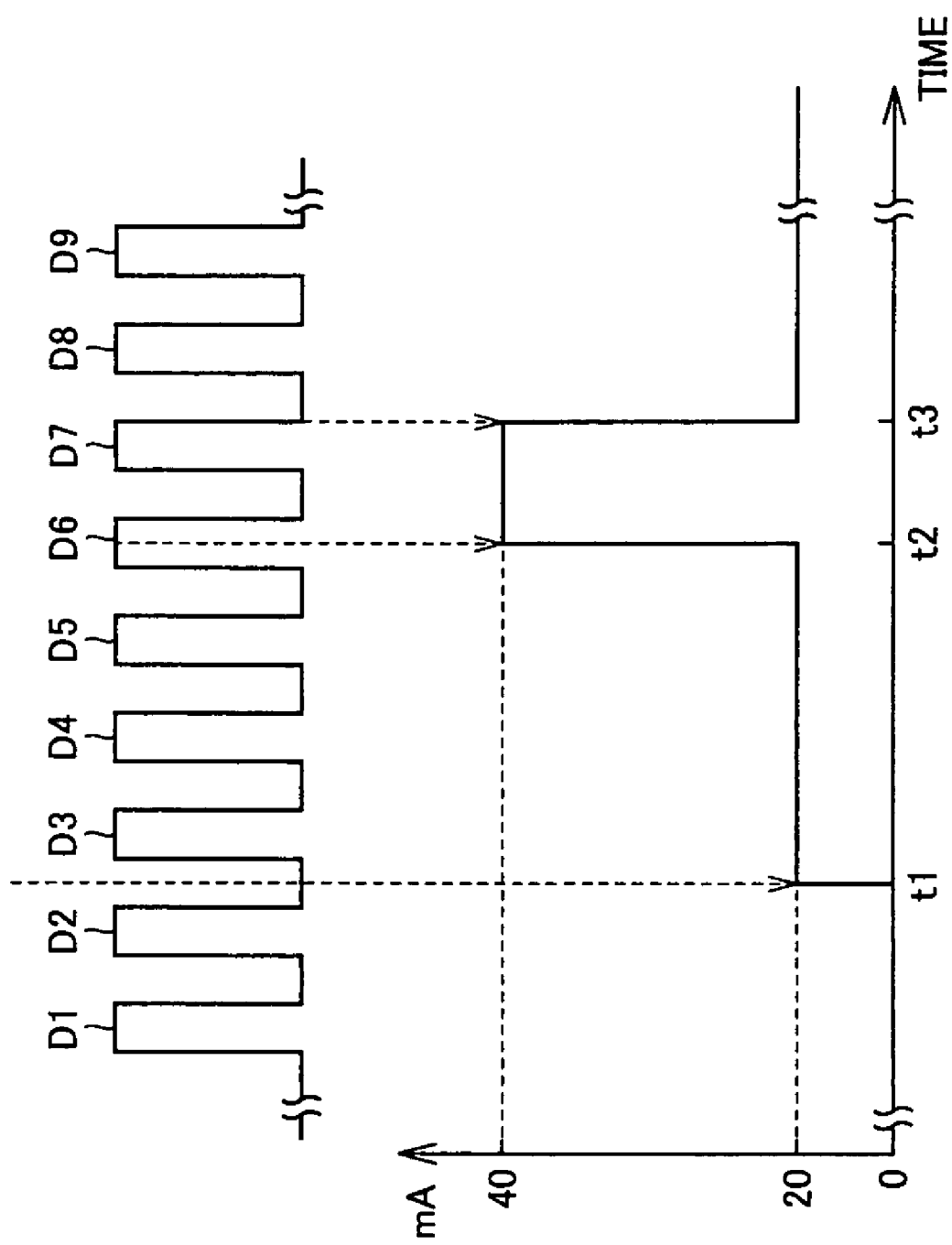
FIGS. 5A and 5B represent a timing of inputting image data and a level of a current supplied to a light source unit, as correlated with each other as time elapses.
Figure 6:
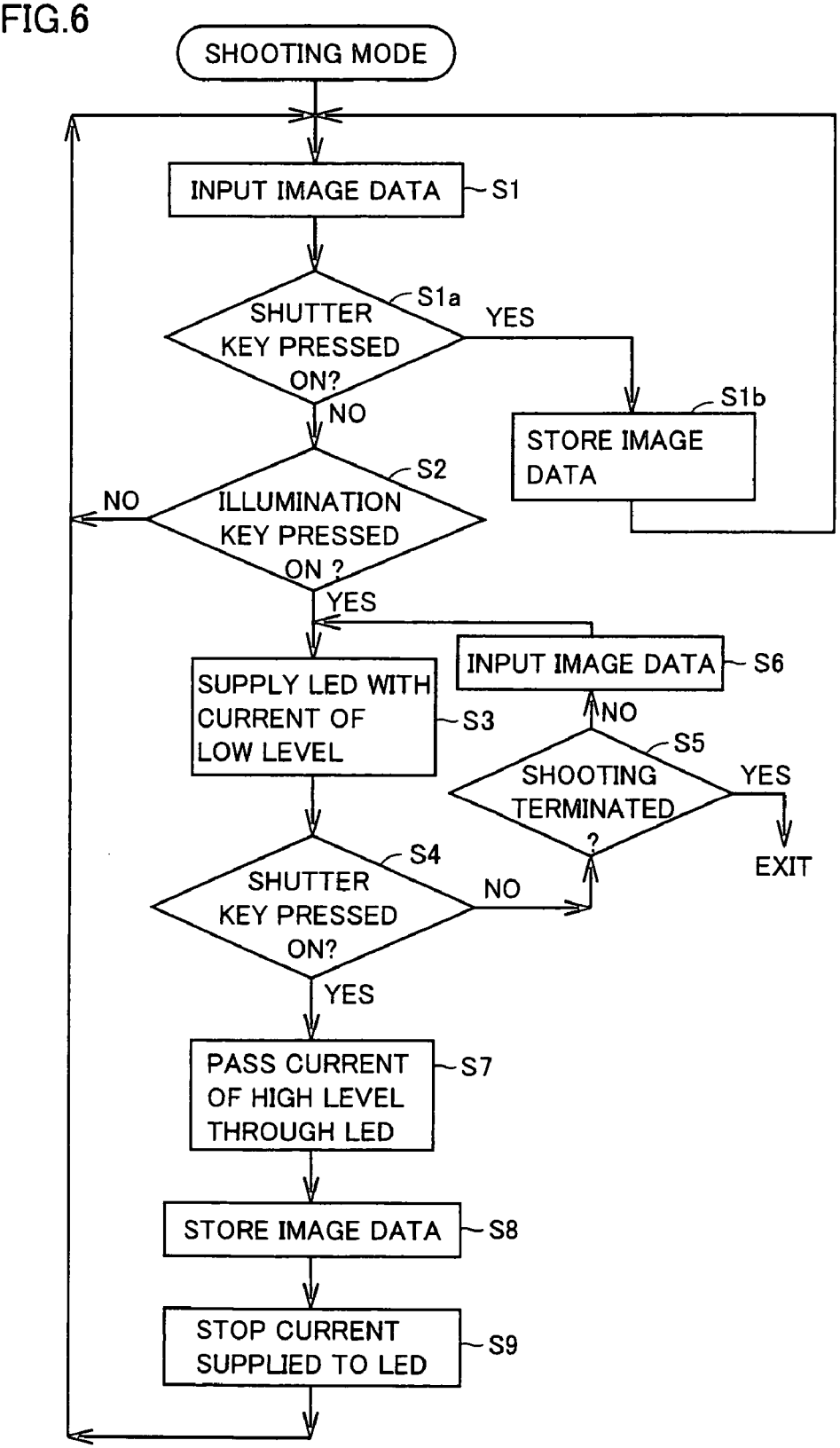
FIG. 6 is a flow chart illustrating an operation in an object shooting mode.

FIGS. 5A and 5B represent a timing of inputting image data Di by camera unit 5 and a level of a current supplied to light source unit 12, as correlated with each other as time elapses. FIG. 6 is a flow chart of an operation in a mode of shooting an object by camera unit 5. In accordance with the FIG. 6 flow chart and with reference to FIGS. 5A and 5B light source unit 12 is controlled, as be described hereinafter. Control signal 32 controls FETs 18–20 to have their respective gates all turned on for the sake of illustration.

Initially, the mobile phone enters the shooting mode, the camera unit picks up an image of an object, and CPU 1 receives image data D1 via camera controller 4 (step (S)1). In response, CPU 1 determines whether shutter key 52 is pressed (S1a). If so then image data D1 is stored by camera controller 4 via memory 40 to memory 2 (S1b). Then CPU 1 returns to S1. If shutter key 52 is not pressed, CPU 1 determines whether illumination key 51 is pressed (S2). If not, FETs 18–20 have their gates all turned on, and LEDs 15–17 are not supplied with a current and do not emit light. The camera shoots an image without LEDs 15–17 emitting white light for illumination.

From camera unit 5 image data D2 is received and subsequently at a time t1 the user presses illumination key 51. In response, CPU 1 outputs control signal 32 to turn off all of the gates of FETs 18–20 and also outputs control signal 33 to control booster circuit 14 to supply a current of a low level to LEDs 15–17. The LEDs all emit light, and white light for illumination is thus output. Note that LEDs 15–17 receive in a forward direction a current of a level for example of 20 mA (S3).

Then, CPU 1 determines whether the user has pressed on shutter key 52 (S4). If not then CPU 1 determines that the shooting mode is terminated (S5), and if so then CPU 1 exits the current process, otherwise, it receives image data D1 (S6) and moves again to S3. Thereafter before shutter key 52 is pressed or a time t2 is reached, i.e., while steps 3–6 are repeated to receive image data D3–D6, CPU 1 performs a process for example to adjust white balance, adjust exposure, set an angle of view, and the like, as has been described previously.

Subsequently when shutter key 52 is pressed (YES at S4) CPU 1 outputs control signal 33 to control booster circuit 14 to boost a level of a current supplied from booster circuit 14 to LEDs 15–17 in the forward direction. For example, it is boosted to 40 mA. As a result, LEDs 15–17 emit light in a rapidly increased quantity to emit a flashlight to illuminate the object (S7). Immediately after shutter key 52 is pressed, image data D7 (obtained through shooting when the flashlight is emitted) is received, and this data is stored by camera controller 4 via memory 40 to memory 2 (S8). After the data has been stored, or at a time t3, CPU 1 outputs control signals 32 and 33 to prevent LEDs 15–17 from receiving a current (S9). Then, CPU 1 returns to S1.

In this scenario, once image data received immediately after shutter key 52 is pressed has been stored to memory 2, LEDs 15–17 are prevented from receiving a current. Alternatively, a current supplied may be controlled to have a low level (20 mA) and the control may return to S3.

Thus by pressing illumination key 51 and shutter key 52 a flashlight emitted in shooting an image of an object and a light different in illuminance and time of emission from the flashlight can selectively be output from a single source of light. An object's image can be shot after illumination key 51 is pressed to output toward the object light for illumination lower in illuminance than a flashlight so that in shooting the object's image the object's eyes can receive less dazzling light than when a flashlight of high illuminance is suddenly output in a dark place. Furthermore, if an object is in a dark place and thus unperceivable, illumination key 51 can be pressed to continuously output light for illumination of a level allowing the object to be confirmed. A function similar to a search light can be provided and by the light for illumination the object can be located and its picture can thus be shot.

As shown in FIG. 5A, when image data D1 and D2 are being input, an image is obtained without light source unit 12 outputting light for illumination, however, when time t1 is reached and illumination key 51 is turned on, for the purpose described above LEDs 15–17 output light of low illuminance for illumination. While the LEDs are doing so, camera unit 5 periodically outputs image data D3, D4 and D5. After time t1 elapses and when time t2 is reached, and shutter key 52 is pressed, a white flashlight will illuminate the object. Immediately thereafter image data D7 is input, and the data is stored to memory 2. At time t3, to cancel the flashlight's illumination, LEDs 15–17 receive a current having a level reduced to 20 mA. Thereafter, image data D8 and D9 are also sequentially input and white balance adjustment and other similar processes as has been described above are performed.

The FIG. 5A image data D1–D9 can each be processed by camera controller 4 and sequentially displayed via LCD controller 6 by LCD 7 on a screen. The user can see the screen of LCD 7 while the user can shoot an image of the object. Note that while a level of a current supplied for flashlight is set to 40 mA, it is not limited thereto and may be a level exceeding 40 mA.

Figure 7:
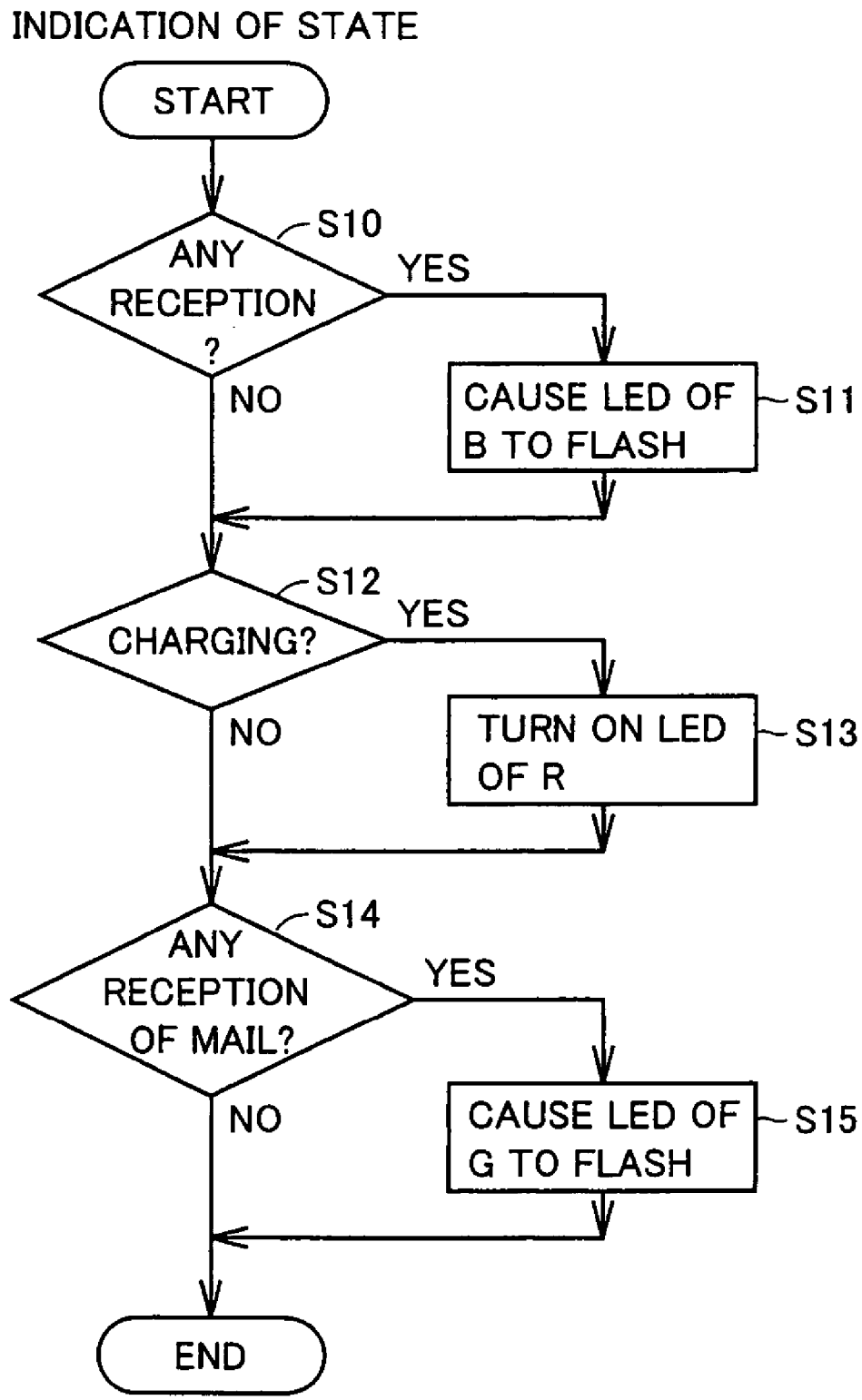
FIG. 7 is a flow chart illustrating a procedure of indicating a state of the mobile phone.

Furthermore, LEDs 15–17 associated with FETs 18–20 having their gates controlled by signal 32 to selectively turn on or off to allow red light emission, green light emission and blue light emission to be combined as desired, can also be used as a lamp to notify a user of the mobile phone's operation state. With reference to FIG. 7, the mobile phone's state is indicated in a procedure, as will be described hereinafter. The FIG. 7 process is effected for example by an interruption of every 20 msec.

CPU 1 detects via antenna 10, wireless system 9 and encoding/decoding circuit 3 that a call is received (S10) and responsively outputs control signals 32 and 33 to light source unit 12 to control it to cause only LED 17 to flash (S11). Blue light can alone flash to notify the user that the call has been received. If the mobile phone's battery 13 is being charged (YES at S12), CPU 1 outputs control signals 32 and 33 to allow light source unit 12 to have LED 15 alone receiving a current in a forward direction to control it to turn on red light (S13). The user, confirming that red light is turned on, can recognize that the mobile phone is being charged.

Furthermore, if CPU 1 detects that mail has been received (YES at S14), CPU 1 outputs control signals 32 and 33 to control light source unit 12 to cause only LED 16 to flash (S15). From the green flashing light, the user can learn that mail has been received.

FIG. 7 illustrates only three states, i.e., reception of a call, charging, and reception of mail. However, other states can also be notified by flashing or turning on more than one LEDs 15–17 combined together. Furthermore, a predetermined color of light common to reception of a call and that of mail may be turned on.

Furthermore, at least one of LEDs 15–17 may be turned on to sound (such as a melody) informing the user that a call, mail or the like has been received. Furthermore, the LEDs may be grouped for different counterparts and turned on for indication. Furthermore, if the mobile phone is used to run software for a game, at least one of LEDs 15–17 may be turned on in accordance with the game's contents or may be turned on in synchronization with the game's sound effect.

The present embodiment allows LEDs 15–17 to emit red light, green light and blue light simultaneously to emit white light. Significantly natural light can be obtained for a flashlight used for shooting a picture. Furthermore, LEDs 15–17 can significantly be miniaturized and readily incorporated even in a mobile phone. Thus a flashlight used for shooting a picture can be output without a large device configuration.

Figure 8:
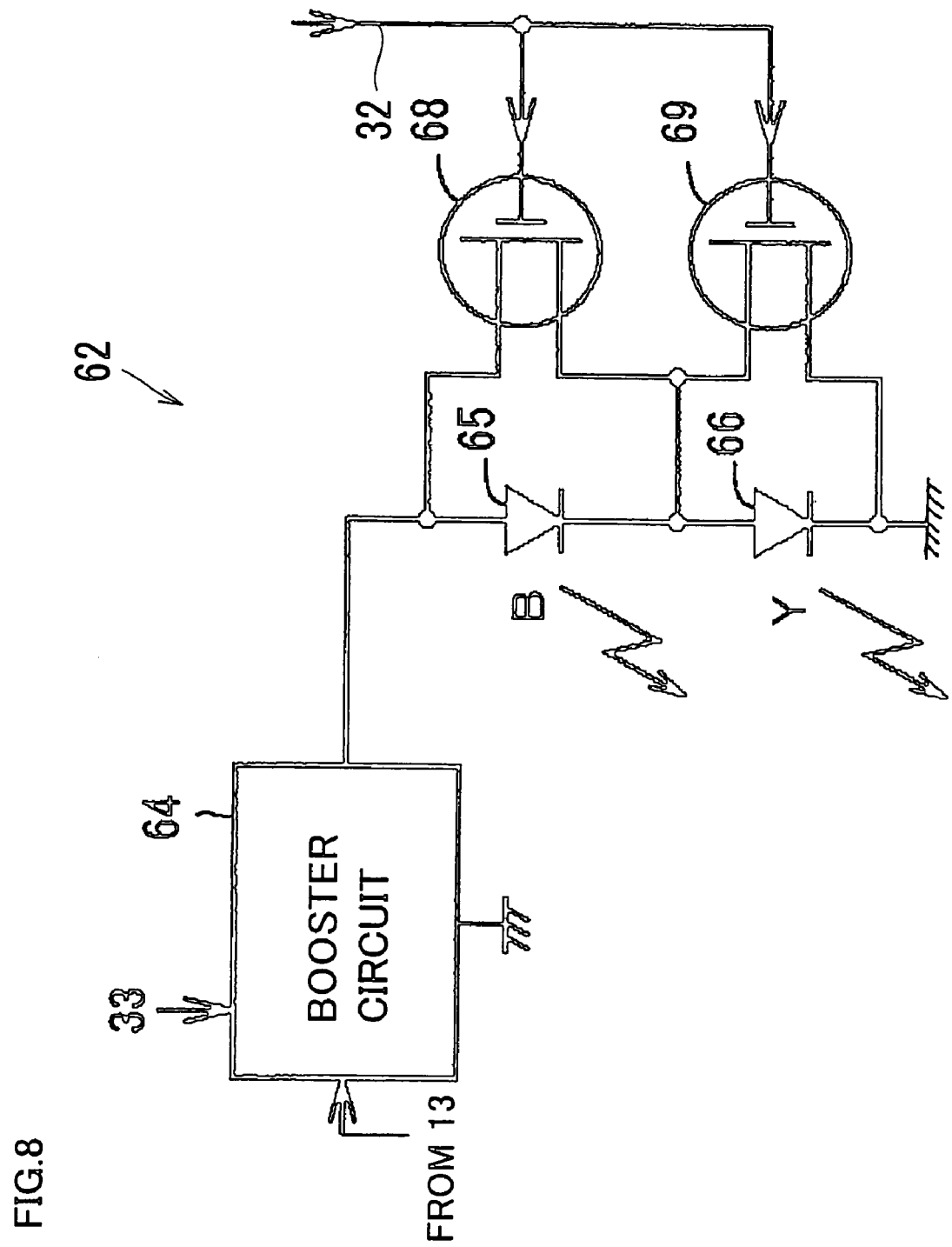
FIG. 8 shows an exemplary configuration of a light source unit in an embodiment.

The above described mobile equipment has light source unit 12 configured of LEDs 15–17 and red light, green light and blue light are simultaneously emitted to generate white light. However, the light source unit's LEDs are not limited in number to three. For example, an example employing two or less LEDs will be described hereinafter. In FIG. 8, a light source unit 62 includes a booster circuit 64, an LED 65 outputting blue light, an LED 66 outputting yellow light, and switching FETs 68–69 associated with LEDs 65 and 66, respectively. LEDs 65 and 66 can be operated to simultaneously emit light to generate white light. In this example, the smaller number of LEDs allow the apparatus to be reduced in size.

Figure 9:
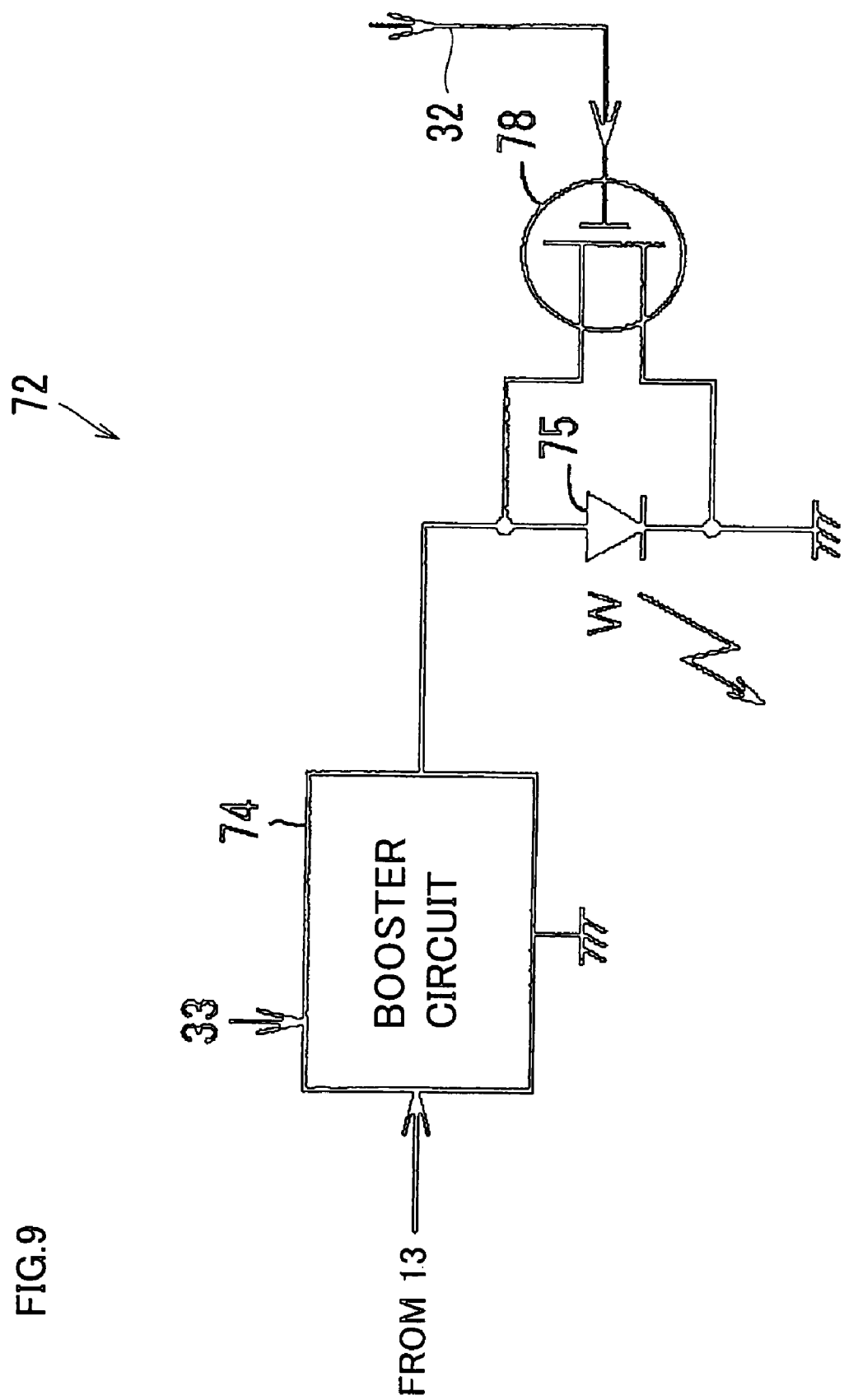
FIG. 9 shows still another exemplary configuration of the light source unit in the embodiment.

In FIG. 9, a light source unit 72 includes a booster circuit 74, an LED 75 outputting white light, and a switching FET 78 associated with LED 75. LED 75 outputting white light is of a type using a blue LED and yellow phosphor to output white light, a type using a blue LED with a colored cap thereon, or the like. A single LED 75 can be used for light source unit 72, and the apparatus can further be miniaturized.

In the above described mobile equipment light source unit 12 can have one or two LEDs alone turned on or flashing to allow the user to recognize that a call has been received, that the phone is being charged, that mail has been received, and other states. Thus, the LEDs can be used for both illumination and indication of states. The apparatus can further be miniaturized.

Furthermore, numeral keys or other similar keys to be operated formed of an optically transmissive material can have LEDs incorporated therein and emitting light to emit white light through the key. The emitted white light can be used together with the above described light source unit to provide a larger quantity of light and also allow the apparatus to be miniaturized, and also inform the user of more states of operation. This example employs a large number of key's LEDs, and is applicable not only to operating LEDs to simultaneously emit light, as described above, but also operating them to sequentially emit light, and in that case, reduced power consumption and the LEDs' increased durability can be achieved. The LEDs may themselves emit white light or may emit light which in turn changes in color to white as the light is transmitted through the key.

In the present embodiment in the shooting mode an LED is used as an auxiliary source of light for shooting to emit white light. For example, a light emitting device generating red light, a light emitting device generating green light and a light emitting device generating blue light can all be supplied with a current to emit light so that a source of light emitting white light can be obtained and white light for illumination can be directed to illuminate an object. Furthermore, as LEDs of three colors, R, G, B, are used, a spectrum of three primary colors of R, G, and B is provided. In shooting, color reproductivity can be enhanced. Furthermore in the shooting mode an object is exposed to white light for illumination. This allows an object in natural light to receive a spot light and thus more clearly be confirmed.

The present embodiment has been described with a mobile phone exemplified as mobile equipment equipped with light source unit 12. The present invention is not limited thereto, and the mobile equipment may be a mobile digital camera or it may be a mobile audio/video (motion or still picture) recorder.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

Thus the present mobile equipment and mobile phone having a shooting function are used for in directing light to an object for illumination to confirm the object and shoot a picture thereof.

What is claimed is:

1. Mobile equipment having a function of shooting a picture of an object, comprising a camera unit, a light source unit emitting white light to serve as an auxiliary light source for shooting a picture, and a display unit displaying an image received from said camera unit to be shot, further comprising:
   an input device including an illumination key and a shutter key; and
   a controller controlling a current supplied to a light emitting diode portion, wherein:
   said light source unit including said light emitting diode portion to emit white light; and
   when said illumination key is operated with said display unit displaying said image said controller supplies a current to said light emitting diode portion at a constant level and when said shutter key is operated said controller increases said current level supplied to said light emitting diode portion to a level for flash light.

2. The mobile equipment according to claim 1, wherein when said illumination key is not operated said controller does not supply said light emitting diode portion with a current and when said light emitting diode portion is not supplied with a current and said shutter key is operated said camera unit shoots a picture without light for illumination.

3. The mobile equipment according to claim 1, wherein when said illumination key is operated said controller supplies said light emitting diode portion with a low level of current.

4. The mobile equipment according to claim 1, wherein when said shutter key is operated said controller increases a level of a current supplied to that of a current applied for flashlight.

5. The mobile equipment according to claim 1, wherein said light emitting diode portion has light emitting diodes receiving a current to emit red light, green light and blue light, respectively.

6. The mobile equipment according to claim 1, further comprising a foldable casing, wherein when said casing is folded said input device is located at an internal surface of said folded casing, and said camera unit and said light source unit at a back of said internal surface of said folded casing.

7. The mobile equipment according to claim 1, having a plurality of states of operation including a telephone call receiving operation and said light source unit is also used as means for signaling said plurality of states of operation.

8. The mobile equipment according to claim 7, wherein said plurality of states of operation include at least one of that of an electronic mail receiving operation and that of a charging operation.

9. Mobile equipment having a function of shooting a picture of an object, comprising:
   a camera unit;
   a display unit displaying an image to be shot received through said camera unit;
   a light source unit having light emitting diodes receiving a current to emit light;
   an input device including an illumination key and a shutter key; and
   a controller controlling said current supplied to said light emitting diodes, wherein when said display unit is displaying said image, in response to said illumination key being operated said controller supplies said current at a constant level to all of said light emitting diodes to illuminate the object and in response to said shutter key being operated said controller increases said current level to that for flash light.

10. The mobile equipment according to claim 9, wherein when said display unit is displaying said image and said illumination key is operated said controller supplies a current to said light emitting diodes such that said current has a constant level to continuously emit light for illumination, and with said light for illumination continuously emitted when said shutter key is operated said controller increases a level of a current supplied to said light emitting diodes to that of a current supplied for flash light to emit light for illumination having a level corresponding to flash.

11. The mobile equipment according to claim 9, wherein when said display unit is displaying said image and said illumination key is not operated said controller does not supply said light emitting diodes with a current and when said current is not supplied and said shutter key is operated said camera unit shoots a picture without light for illumination.

12. The mobile equipment according to claim 9, wherein when said illumination key is operated said controller supplies said light emitting diodes with a low level of current.

13. The mobile equipment according to claim 9, further comprising a foldable casing, wherein when said casing is folded said input device is located at an internal surface of said folded casing, and said camera unit and said light source unit at a back of said internal surface of said folded casing.

14. The mobile equipment according to claim 9, having a plurality of states of operation including a telephone call receiving operation and said light source unit is also used as means for signaling said plurality of states of operation.

15. The mobile equipment according to claim 14, wherein said plurality of states of operation include at least one of that of an electronic mail receiving operation and that of a charging operation.

16. The mobile equipment according to claim 9, wherein said light source unit has light emitting diodes receiving a current to emit red light, green light and blue light, respectively.

17. The mobile equipment according to claim 1, wherein said controller controls said current supplied to said light emitting diode portion by adjusting a pulse width.

18. The mobile equipment according to claim 9, wherein said controller controls said current supplied to said light emitting diodes by adjusting a pulse width.

* * * * *